United States Patent [19]

Dansbury

[11] 4,155,472
[45] May 22, 1979

[54] TIRE TRANSFER ARM

[75] Inventor: Donald J. Dansbury, Troy, Mich.

[73] Assignee: The United States of America as represented by the Secretary of the Army, Washington, D.C.

[21] Appl. No.: 853,019

[22] Filed: Nov. 18, 1977

[51] Int. Cl.$^2$ ............................................. B62D 43/02
[52] U.S. Cl. .................................. 414/466; 224/42.21
[58] Field of Search ............... 214/450, 451, 452, 453, 214/454, 77 R, 80, 130 R; 224/42.21, 42.24, 42.2, 42.28, 42.06, 42.08

[56] References Cited

U.S. PATENT DOCUMENTS

| 1,864,829 | 6/1932 | Kennedy et al. | 214/452 |
| 2,377,149 | 5/1945 | Heil | 214/451 |
| 2,464,071 | 3/1949 | Coffing | 214/77 R |
| 2,991,894 | 7/1961 | Walker | 214/454 |
| 3,667,621 | 6/1972 | Barlow | 214/77 R X |
| 3,924,765 | 12/1975 | Hostetler | 214/80 X |

FOREIGN PATENT DOCUMENTS 930973  7/1955  Fed. Rep. of Germany ........... 214/454

*Primary Examiner*—Frank E. Werner
*Attorney, Agent, or Firm*—Peter A. Taucher; John E. McRae; Nathan Edelberg

[57] ABSTRACT

A power-operated tire transfer arm pivotally connected to a wheeled vehicle for swinging movement in the area directly behind the vehicle cab to transfer a large heavy vehicle spare tire to/from a lowered position resting on the ground from/to a raised position supported on the vehicle. The transfer arm is designed to assist the driver of the vehicle in changing a tire in remote locations where crane facilities are not available to lower the spare tire to ground level or to raise the blown tire to a stored position on the vehicle.

1 Claim, 3 Drawing Figures

U.S. Patent  May 22, 1979  4,155,472
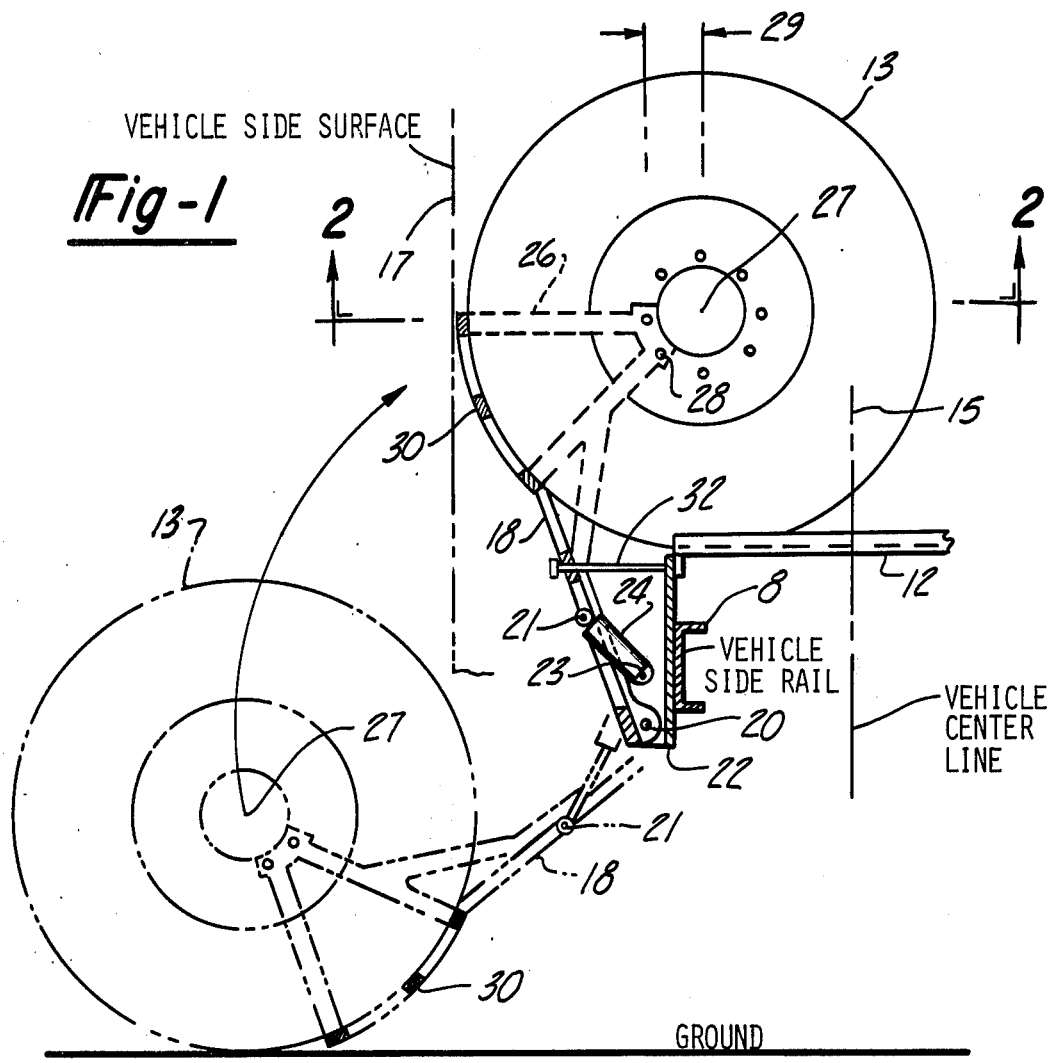
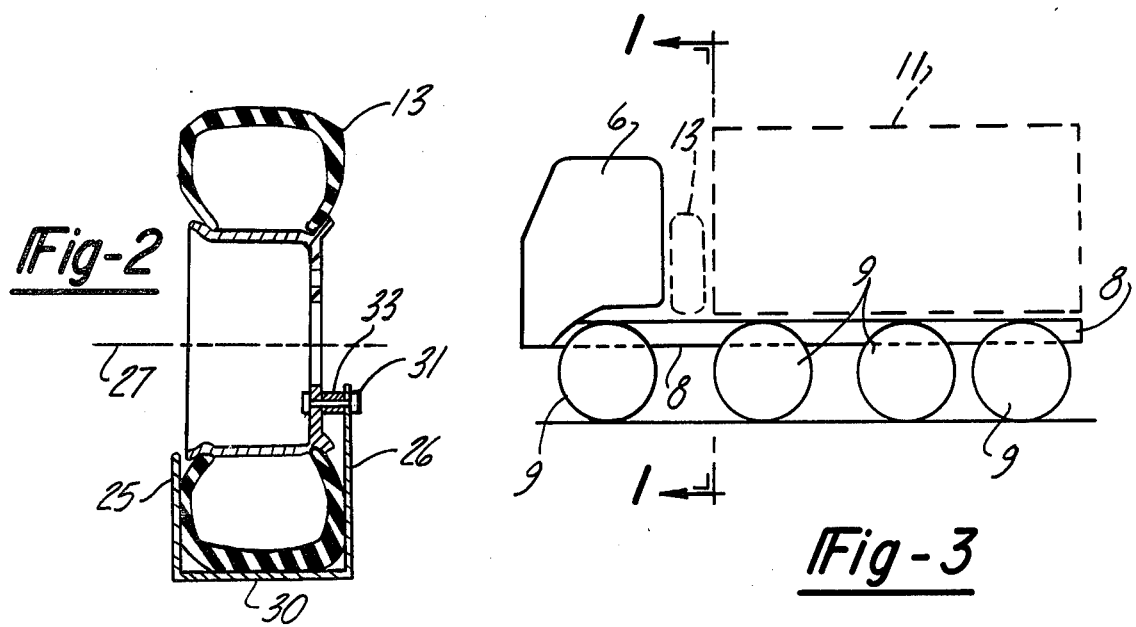

TIRE TRANSFER ARM

BACKGROUND AND SUMMARY OF THE INVENTION

This invention relates to a tire transfer arm pivotally connected to a vehicle for raising or lowering large heavy tires between stored positions on the vehicle and lowered positions resting on the ground surface. The transfer arm is particularly useful on large trucks or tractor trailers that use large wheel-tire units weighing upwards of three hundred pounds.

The tire transfer arm is designed to be a relatively low cost component that utilizes a comparatively small space on the vehicle. The transfer arm is intended to be mounted in a relatively accessible location on the vehicle so that it can be actuated by the driver while standing on the ground alongside the vehicle during a one-man tire change operation.

The invention described herein may be manufactured, used, and licensed by or for the Government for governmental purposes without payment to me of any royalty thereon.

THE DRAWINGS

FIG. 1 is an elevational view of a tire transfer arm constructed according to this invention. The arm is shown in full lines retaining the tire in a raised position; the transfer arm is shown in dotted lines retaining the tire in a lowered position resting on the ground surface.

FIG. 2 is a fragmentary sectional view taken on line 2—2 in FIG. 1.

FIG. 3 is a side elevational view of a truck that could utilize this invention.

THE DRAWINGS IN GREATER DETAIL

FIG. 3 is an elevational view of a conventional truck that includes a cab 6 mounted on two side rails 8, only one of which is shown in the drawing. The illustrated vehicle is a four axle vehicle having eight or more wheels (tires) 9; the invention is applicable to vehicles with any number of wheels, but especially to vehicles having large heavy wheels that are difficult to lift or control. The vehicle of FIG. 3 includes a load 11 that is suitably supported on side rails 8 in a location behind cab 6. The load 11 can be differently constructed depending on the vehicle purpose, e.g. a flat cargo bed, a wrecker crane, closed van body, a liquid-carrying tank, or open cargo box.

In this particular vehicle the space between cab 6 and load 11 is utilized to carry a spare tire, designated 13 in the drawing. The present invention is directed to a transfer arm for moving the spare tire between ground level and the elevated position designated by numeral 13 in FIG. 3. FIG. 1. is an elevational view of the transfer arm taken generally along the line 1—1 in FIG. 3. In FIG. 1 one of the vehicle side rails 8 is shown in cross section to the left of imaginary vehicle centerline 15. The outer side surface of the vehicle (cab 6 and load 11) is at approximately the location designated by numeral 17 in FIG. 1. Therefore the spare tire 13 is within the side surface profile 17 of the vehicle when the tire is in its raised full line position.

The tire transfer arm designated by numeral 18 is pivotally connected at 20 to a bracket 22 suitably affixed to vehicle side rail 8. Preferably arm 18 is of skeleton construction for weight reduction and clearance considerations. The outer free end 30 of the transfer arm has an arcuate configuration conforming to the tread area of the tire so that when the transfer arm is in its lowered dotted line position the tire can be rolled to or from the transfer arm, thereby eliminating the need for the driver having to lift the heavy tire. Arm 18 includes two sector walls 25 and 26 extending right angularly from wall 30 (as seen in FIG. 2) toward the axis 27 of the craddled wheel tire assembly. The inner end area of sector wall 26 nearest the wheel axis is provided with one or more holes or slots 28 (FIG. 1) that align with the holes in the wheel used to mount the wheel-tire assembly on the vehicle axle. A bolt 31 can be extended through the aligned holes to clamp the spare tire on transfer arm 18. If desired, a sleeve-like spacer 33 may be inserted on bolt 31 to maintain the desired orientation of the wheel relative to the transfer arm. The transfer arm is preferably designed so that sector arms 25 and 26 are spaced slightly further apart than the width of the tire, whereby the tire can be rolled onto the transfer arm into rather snug engagement with the sector walls. The sector walls thus cooperate with the bolt 31 to firmly but releasably retain the wheel-tire unit on the transfer arm.

It is contemplated that power mechanism will be used to elevate the transfer arm from its lowered position to its raised position. Such power mechanism could take various forms such as cable-winch arrangement, or a motorized ball-screw unit, or a fluid cylinder. FIG. 1 illustrates the power mechanism as a fluid cylinder 24 having a pivotal connection 23 with bracket 22 and a pivotal connection 21 with the transfer arm 18. The fluid cylinder could be double acting, but for most situations it is believed that a single acting cylinder would be sufficient. Thus, the cylinder would be pressurized to move the transfer arm 18 from its lowered dotted line position to its raised full line position; controlled depressurization of the cylinder would permit movement of the transfer arm back to the lowered position. Fluid pressure could be obtained from an on-board pressure source or a small electric motor-operated pump, or a small manual pump. The pump is not shown in the drawings.

It will be noted that pivot axis 20 for the transfer arm is located at appreciable distance below the spare tire axis 27 when the tire is in its raised position. Also, pivot axis 20 is located a slight distance outboard from the spare tire axis 27 as denoted by dimensional distance 29. The dimensional distances are such that during the last stage of movement of the tire toward its raised position the tire is moving in a downward arc. This action allows the tire to automatically go as far as necessary to engage the vehicle floor surface 12. The tire weight is borne primarily by floor 12 rather than transfer arm 18. The transfer arm acts primarily to prevent the tire from rolling off floor 12. When the vehicle is moving the transfer arm 18 may be latched in a fixed orientation relative to floor 12 by means of a conventional tie rod 32. Prior to a tire dismount operation the tie rod 32 is disengaged from arm 18.

The pivot connection 23 for the fluid cylinder is preferably located substantially directly above the transfer arm pivot axis 20 so that the fluid cylinder line of action does not cross or intersect pivot axis 20 during the arc travel of arm 18; there is no overcenter action, and a single acting fluid cylinder can be used in a simple pressurization-depressurization cycle.

When the tire is in its lowered position it is located substantially outside the vehicle profile defined by side surface 17. Therefore the tire is accessible for roll-off and roll-on purposes. The transfer arm 18 is designed as a relatively low cost structure having a single pivotal connection 20 with the vehicle, without need for intervening linkages that would tend to complicate the mechanism from the the standpoint of manufacturing cost or service life. The invention when used in most vehicles would involve the location of pivot axis 20 below floor 12 and approximately midway between the vehicle centerline 15 and the vehicle side surface profile line 17.

I wish it to be understood that I do not desire to be limited to the exact details of construction shown and described for obvious modifications will occur to a person skilled in the art.

I claim:

1. In a vehicle comprising a cab having side surfaces, and a floor (12) behind the cab for supporting a spare tire in an upright attitude normal to the vehicle longitudinal centerline and within the side surface profile of the cab: the improvement comprising a bracket (22) affixed to the vehicle below the aforementioned floor; a tire transfer arm pivotally connected to the vehicle bracket for swinging movement around an axis (20) paralleling the vehicle longitudinal centerline, said arm including at its free end a sector wall for receiving the tire; means (31) for releasably clamping the spare tire to the transfer arm whereby the tire is transferable back and forth between a lowered position resting on the ground and a raised position resting on the aforementioned floor; a single acting fluid cylinder having pivotal connections (at 23 and 21) with the vehicle bracket and transfer arm for effecting arm movement between the lowered and raised positions; the pivot axis for the transfer arm being located an appreciable distance below and a slight distance outboard from the spare tire axis (27) when the tire is in its raised position, whereby the tire is caused to move in a downward arc during the last stage of its movement toward the raised position; the vehicle-cylinder pivotal connection (23) being located substantially directly above the transfer arm pivot axis; said fluid cylinder extending upwardly and outwardly from its vehicle connection point (23) to its arm connection point (21) when the tire is in its raised position; the pivot axis for the transfer arm being located approximately midway between the vehicle centerline and the cab side surface profile, the length of the transfer arm being such that the tire is located substantially outside the cab side surface profile when the tire is in its lowered position; the transfer arm pivot axis (20) being located a substantial distance below the aforementioned floor (12) so that the transfer arm moves through an arc of approximately one hundred ten degrees as it transfers the tire between its lowered and raised positions.

* * * * *